United States Patent
Li

(10) Patent No.: US 10,198,116 B2
(45) Date of Patent: Feb. 5, 2019

(54) PRESSURE SENSING DEVICE, PRESSURE MEASURING APPARATUS, TOUCH CONTROL BOARD, AND DISPLAY APPARATUS

(71) Applicant: SHENZHEN NEW DEGREE TECHNOLOGY CO., LTD., Shenzhen, Guangdong (CN)

(72) Inventor: Hao Li, Guangdong (CN)

(73) Assignee: SHENZHEN NEW DEGREE TECHNOLOGY CO., LTD., Shenzhen (CN)

( * ) Notice: Subject to any disclaimer, the term of this patent is extended or adjusted under 35 U.S.C. 154(b) by 2 days.

(21) Appl. No.: 15/503,220

(22) PCT Filed: Apr. 24, 2015

(86) PCT No.: PCT/CN2015/077394
§ 371 (c)(1),
(2) Date: Feb. 10, 2017

(87) PCT Pub. No.: WO2016/169049
PCT Pub. Date: Oct. 27, 2016

(65) Prior Publication Data
US 2017/0228093 A1    Aug. 10, 2017

(51) Int. Cl.
*G06F 3/041* (2006.01)
*G02F 1/1333* (2006.01)

(52) U.S. Cl.
CPC ........ *G06F 3/0416* (2013.01); *G02F 1/13338* (2013.01); *G06F 3/0412* (2013.01); *G06F 3/041* (2013.01); *G06F 2203/04105* (2013.01)

(58) Field of Classification Search
CPC ...... G06F 3/041; G06F 3/0412; G06F 3/0416; G06F 2203/04103; G06F 2203/04105; G02F 1/13338
See application file for complete search history.

(56) References Cited

U.S. PATENT DOCUMENTS

| | | | | |
|---|---|---|---|---|
| 8,810,524 B1 * | 8/2014 | Rosenberg | ............ | G06F 1/1643 345/1.1 |
| 2010/0013790 A1 * | 1/2010 | Ahn | ...................... | G06F 1/3203 345/174 |

(Continued)

FOREIGN PATENT DOCUMENTS

| CN | 101246405 | 8/2008 |
|---|---|---|
| CN | 101989003 | 3/2011 |

OTHER PUBLICATIONS

International Search Report for PCT/CN2015/077394, dated Feb. 2, 2016, 4 pages.

*Primary Examiner* — Tom V Sheng
(74) *Attorney, Agent, or Firm* — Nixon & Vanderhye PC

(57) ABSTRACT

A pressure sensing device of the present invention comprises a top panel, a first sensing board member, a second sensing board member, and a control circuit board. The first sensing board member is provided with cut-out patterns, comprising pressure concentration point positions. The upper surface of the first sensing board member with cut-out patterns is connected via a first connecting material to the top panel. The second sensing board member is connected to a lower surface of the first sensing board member. The control circuit board is electrically connected to a second sensing board member. The present application also provides an area pressure measuring apparatus, a touch control board, and a display apparatus.

19 Claims, 8 Drawing Sheets

(56) References Cited

U.S. PATENT DOCUMENTS

| | | | | |
|---|---|---|---|---|
| 2010/0259368 A1* | 10/2010 | Fahn | ................ | G06F 3/041 |
| | | | | 340/384.1 |
| 2012/0260220 A1* | 10/2012 | Griffin | ................ | G06F 3/033 |
| | | | | 715/863 |
| 2014/0043289 A1* | 2/2014 | Stern | ................ | G06F 3/044 |
| | | | | 345/174 |
| 2014/0238152 A1* | 8/2014 | Kallassi | ................ | G01R 27/2605 |
| | | | | 73/862.626 |
| 2015/0296062 A1* | 10/2015 | Lee | ................ | G02F 1/133345 |
| | | | | 455/566 |
| 2017/0083140 A1* | 3/2017 | Leng | ................ | G06F 3/044 |
| 2017/0090618 A1* | 3/2017 | Qiao | ................ | G06F 3/041 |
| 2018/0046298 A1* | 2/2018 | Weng | ................ | G02F 1/13338 |

* cited by examiner

PRESSURE SENSING DEVICE, PRESSURE MEASURING APPARATUS, TOUCH CONTROL BOARD, AND DISPLAY APPARATUS

This application is the U.S. national phase of International Application No. PCT/CN2015/077394 filed 24 Apr. 2015, which designated the U.S., the entire contents of which is hereby incorporated by reference.

TECHNICAL FIELD

The present application relates to the technical field of pressure sensors, and more particularly relates to a pressure sensing device, a pressure measuring apparatus having the pressure sensing device, a touch control board having the pressure sensing apparatus, and a display apparatus having the pressure sensing device.

BACKGROUND

At present, pressure sensing devices have already begun to be applied gradually in every field, and a main function of a pressure sensing device lies in: reducing a size of a sensor and simultaneously increasing a sensitivity of the sensor and a detectable quantity of information. In addition, the pressure sensing device can be arranged in a touch control electronic device such as a touch screen handheld computer, a touch control display device, and so on, thereby achieving an accurate recognition of a touched position and accurately recognizing the pressure value at the same time, so that application space of electronic devices in product applications, human-machine interactions and consumption experience is expanded.

The existing pressure sensing devices can be classified into a resistive strain gauge type, a capacitive sensing type and a piezoelectric ceramic type. Furthermore, all pressure sensing devices in the aforesaid types form bodies of sensing devices by complex circuit designs and structural designs, specifically:

First, the resistive strain gauge type; it needs to select resistive strain gauges that meet the requirements for resistance and resistance deviation from many produced strain gauges, and further combine the strain gauges into a certain circuit structure and use glue to connect the circuit structure to a sensing structure. However, since a deformation amount of a strain gauge is small, the sensing structure needs to be accurately positioned and carefully adhered.

Second, the capacitive sensing type; it needs to strictly control a distance between each capacitance contact and a panel, so as to obtain pressure information through the variation of the distance. However, this method requires extremely high machining accuracy and assembly accuracy.

Third, the piezoelectric ceramic type; it obtains a pressure value by instantaneously impacting piezoelectric ceramic and obtaining a transitory voltage variation. However, manufacture of this pressure sensing device needs uniform piezoelectric ceramic pieces, which need to be mounted on a preset structure by a special assembly method.

It can be seen that the pressure sensing devices in the prior art have the problems of complex structures, a complicated processes, high manufacturing cost, and low touching accuracies, which are bad for popularization and use of the pressure sensing devices.

Therefore, it is necessary to provide a technical solution to solve the aforesaid deficiencies.

Technical Problem

A purpose of the present application is to overcome the deficiencies in the prior art and provide a pressure sensing device to solve the problem that the pressure sensing devices in the prior art have complex structures, complicated processes, high manufacturing cost, and a bad touching accuracy.

Technical Solution

The present application is implemented as follows:

A pressure sensing device which comprises:

a top panel configured to receive pressure from a user;

a first sensing board member configured to sense an external pressure acting thereon; wherein the first sensing board member comprises an upper surface and a lower surface arranged to be opposite to the upper surface, and the first sensing board member is provided thereon with cut-out regions configured to concentrate the external pressure, each cut-out pattern comprises a pressure concentration point position configured for concentrating the external pressure at a point location, and the upper surface of the first sensing board member with cut-out patterns is connected with the top panel through a first connecting material;

a second sensing board member configured to sense an external pressure acting thereon, wherein the second sensing board member is connected with the lower surface of the first sensing board member; and a control circuit board configured to control an electronic device to perform a corresponding task according to the pressure information provided by the user, and the control circuit board is electrically connected with the second sensing board member.

Specifically, said each cut-out pattern further comprises at least two first extending segments extending outward from the pressure concentration point position.

Further, the at least two first extending segments are strip shaped.

Preferably, the at least two first extending segments are symmetrically arranged or asymmetrically arranged.

Furthermore, there are at least two second extending segments configured to extend sideways from each end of at least one of the at least two first extending segments.

Furthermore, the at least two second extending segments are symmetrically arranged or asymmetrically arranged.

Preferably, the at least second extending segments are strip shaped.

Preferably, the at least second extending segments are arc shaped.

Specifically, there are at least four cut-out patterns, and the at least four hollow regions are arranged uniformly at a circumference of the first sensing board member.

Furthermore, the second sensing board member comprises a pressure sensing layer and sensing components arranged on the pressure sensing layer, wherein the cut-out patterns are arranged to be aligned with the sensing components.

Furthermore, each sensing component is a coating or a circuit having pressure sensing effect.

Specifically, the first connecting material is any one of a double-sided adhesive, an acrylic polystyrene foam, a UV glue, an AB glue, and a silica gel configured to connect the top panel with the first sensing board member and to provide a spacer between the top panel and the first sensing board member.

Specifically, the second sensing board member is connected with the lower surface of the first sensing board member through a second connecting material, and the second connecting material is any one of a double sided adhesive, an acrylic polystyrene foam, a UV glue, an AB glue, and a silica gel.

Specifically, the control circuit board is electrically connected with the second sensing board member through a connecting wire.

Advantageous Effects of the Present Application

The technical effects of the pressure sensing device of the present application are as follows: since the first sensing board member of the pressure sensing device of the present application is provided thereon with cut-out patterns, and each cut-out pattern comprises a pressure concentration point position, when a user applies a certain pressure on the top panel, the pressure can be transferred to the first sensing board member through the first connecting material; when the first sensing board member is subjected to a force, the applied force can be concentrated at the pressure concentration point position of the cut-off pattern, thereby ensuring the user to press accurately; afterwards, the applied force will be transferred to the second sensing board member, and the control circuit board will control the touch control electronic device to perform a corresponding task according to information of the pressure applied by the user and transferred from the second sensing board member; it can be seen that the whole touching and pressing operation is simple, convenient, and easy to be measured; meanwhile, the pressure sensing device has a simple structure, is easy to be processed, and has low manufacturing cost, which facilitates popularization and use of the pressure sensing device.

The present application further provides a pressure measuring apparatus which comprises the aforesaid pressure sensing device, and the top panel is a metal panel, a glass panel, and a plastic panel.

The present application further provides a touch control board which comprises the aforementioned pressure sensing device, and the top panel is a pressure controllable mouse panel.

The present application further provides a display apparatus which comprises the aforesaid pressure sensing device, and the upper panel is a touch screen or a touch control display screen that combines a touch control function and a display function together.

DETAILED DESCRIPTION OF THE PREFERRED EMBODIMENT

Figure 1:
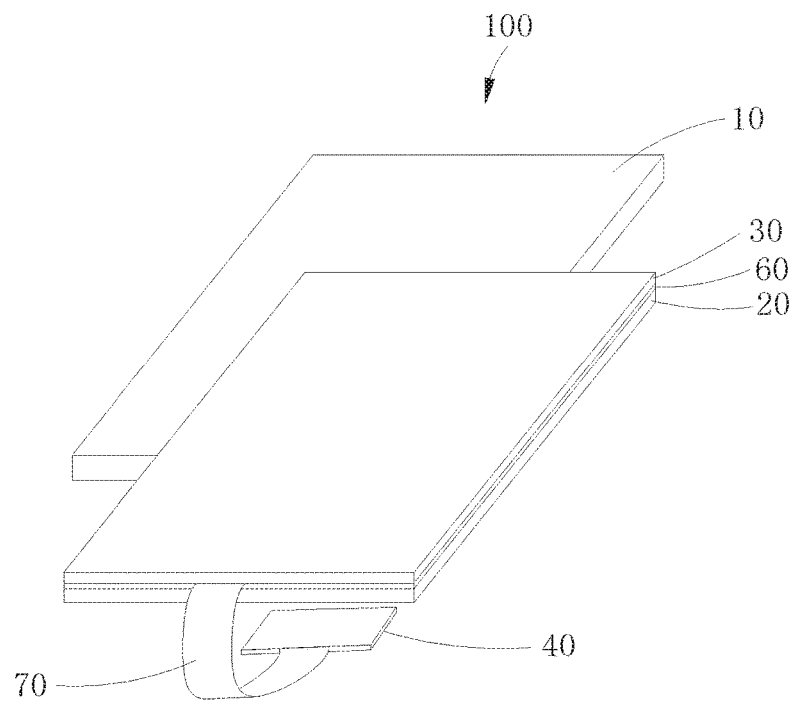
FIG. 1 illustrates a perspective view of a pressure sensing device of the present application.

In order to make the purposes, technical solutions, and advantages of the present application be clearer and more understandable, the present application will be further described in detail hereinafter with reference to the accompanying drawings and embodiments. It should be understood that the embodiments described herein are only intended to illustrate but not to limit the present application.

An Embodiment of a Pressure Sensing Device

Embodiment I

Please refer to FIGS. 1-3, the embodiment I of a pressure sensing device of the present application is described as follows.

A touch control electronic device of this embodiment can be a touch control handheld computer, and can also be a touch control display device; the pressure sensing device 100 comprises an top panel 10, a first sensing board member 20, a second sensing board member 30, and a control circuit board 40; each of the components of the pressure sensing device 100 will be further described hereinafter.

The top panel 10 can allow a user to apply a pressure; wherein, the top panel 10 is a panel having a rigid structure, therefore, when a user touches and presses the top panel 10, the top panel 10 itself can maintain its shape or at least do not generate an obvious deformation. Specifically, when the user applies a pressure on the top panel 10, the top panel 10 itself does not collapse under the pressure, or the deformation of the upper top 10 is much less than a space between the top panel 10 and the first sensing board member 20. In addition, when the touch control electronic device is a touch control handheld computer, the top panel 10 can be configured to be a glass board having a thickness of 1.1 mm; when the touch control electronic device is a touch control display device, the top panel 10 can be configured to be an LCD panel having a thickness of 1.6 mm. Meanwhile, the top panel 10 can also be an electronic component having both a touch control function and a display function.

The first sensing board member 20 can sense external pressures applied thereon, wherein, the first sensing board member 20 comprises an upper surface 21 and a lower surface 22 arranged to be opposite to the upper surface 21, and the first sensing board member 20 is provided thereon with cut-out patterns 23 configured to concentrate external pressures to sense, each cut-out region 23 includes a pressure concentrating point position 230 configured for concentrating the external pressures at a point location, and the upper surface 21 of the first sensing board member 20 with the cut-out pattern 23 are connected with the top panel 10 through a first connecting material 50.

The second sensing board member 30 can sense external pressures applied thereon and is covered by a pressure sensitive membrane; wherein the second sensing board member 30 is affixed to the lower surface 22 of the first sensing board member 20; preferably, the second sensing board member 30 can be a board member coated with a polymer coating having a pressure sensing capability by printing, or be a board member having a sintered piezoelectric ceramic coating; however, the implementation of this embodiment is not limited thereto. Moreover, the second sensing board member 30 can also be made by a quantum tunneling compound, a capacitive sensor, or some other pressure sensitive resistors technologies.

The control circuit board 40 can be configured to control the touch control electronic device to perform a corresponding task according to information of a pressures applied by a performer, and the control circuit board 40 is electrically connected with the second sensing board member 30. Thus, it can be understood that the control circuit board 40 is a combination of hardware and software having a plurality of processing methods, and these hardware and software are configured to be capable of using control information input by the second sensing board member 30 to commnunicate through feedback or a system associated with a client and performing additional corresponding tasks or functionalities. In addition, a board body of the control circuit board 40 is integrated thereon with a processor, a content addressable memorizer, a digital signal processor, a DAC (Digital to Analog Converter) switch, a PLC (Programmable Logic Controller), separated hardware and/or the combination thereof, and is further provided therein with embedded function modules of algorithms and software information relating to the top panel 10 and/or a pressure sensing system.

Since the first sensing board member 20 of the pressure sensing device 100 of the present application is provided thereon with cut-out patterns 23, and each cut-out pattern 23 comprises a pressure concentration point position 230, when a user applies a certain pressure on the top panel 10, the pressure can be transferred to the first sensing board member 20 through the first connecting material 50; when the first sensing board member 20 is subjected to a force, the applied force can be concentrated at the pressure concentration point position 230 of the cut-out pattern 23, thereby ensuring the user to press accurately; afterwards, the applied force will be transferred to the second sensing board member 30, and the control circuit board 40 will control the touch control electronic device to perform a corresponding task according to information of the pressure applied by the performer and transferred from the second sensing board member 30; it can be seen that the whole touching and pressing operation is simple, convenient and is easy to be measured; meanwhile, the pressure sensing device has a simple structure, is easy to be processed, and has low manufacturing cost, which facilitates popularization and use of the pressure sensing device 100.

Figure 3:
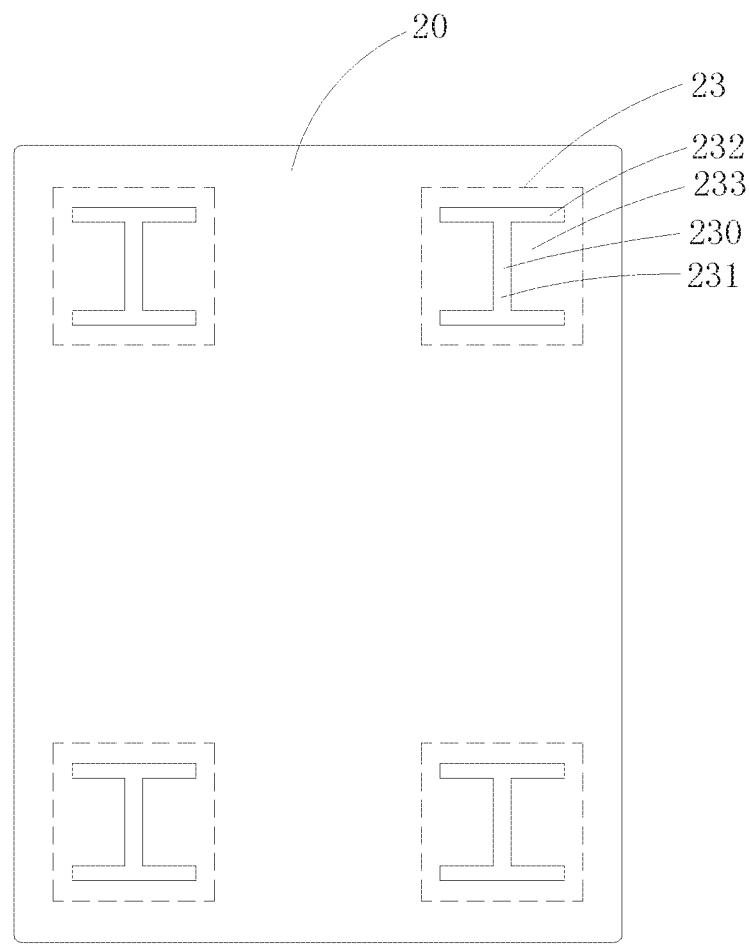
FIG. 3 illustrates a schematic view of a first sensing board member of the pressure sensing device of the present application.

Please refer to FIG. 3, as a preferable solution of this embodiment, there are at least four cut-out patterns 23, and the at least four cut-out patterns 23 are uniformly arranged at the circumference of the first sensing board member 20 respectively, such that the applied force acting on the second sensing board member 20 can be concentrated on the circumference of the first sensing board member 20 respectively, which is helpful to transfer the pressure to a designated region to be concentrated. Preferably, there are four cut-out patterns 23, which facilitates manufacturing and processing, and this embodiment is described on the basis of four hollow regions 23.

Please further refer to FIG. 3, for facilitating the concentration of external pressures at the pressure concentration point position 230, each cut-out pattern 23 of this embodiment further comprises at least two first extending segments 231 arranged to extend outwards from the pressure concentration point position 230; wherein, in order to simplify the structure and facilitating manufacturing and processing, in this embodiment, there are two first extending segments 231.

In addition, there is a solid portion of the first sensing board member 20 between two adjacent first extending segments 231, in other words, the two first extending segments 231 concentrate the pressure concentration point position 230, and the solid portion of the first sensing board member 20 between two adjacent first extending vacant spaces 231 forms a cantilever structure 233; therefore, when a pressure or other applied forces act on the area with cut-out pattern 23 of the first sensing board member 20, the pressure can be concentrated at the pressure concentration point position 230 of the cut-out pattern 23. In addition, when the first connecting material 50 is adopted to connect the upper surface of the upper end of the first sensing board member 20 with cut-out patterns 23 to the top panel 10, one end of the first connecting material 50 is connected with the top panel 10, and the other end of the first connecting material 50 is connected with the cantilever structure 233 of the cut-out pattern 23.

Meanwhile, for benefiting the production, the first extending segment 231 is shaped as a transversal strip structure; of course, it can also be configured to be other shapes and structures, such as arc-shape. Therefore, the protection for the shape and structure of the first extending segment 231 in this embodiment is not limited thereto.

Please further refer to FIG. 3, preferably, the two first extending segments 231 are symmetrically arranged or asymmetrically arranged, however, in this embodiment, the two first extending segments 231 are symmetrically arranged, that is, one first extending segment 231 can coincide with the other first extending segment 231 by taking the center of the pressure concentration point position 230 as a point of rotation and rotating by 180 degrees, thereby further facilitating an uniform concentration of the pressure or the applied force at the pressure concentration point position 231.

What's more, a second extending segments 232 configured to extend towards sideways at a distal end of each first extending segment 231, such that the pressure can be further concentrated at the pressure concentration point position 230; furthermore, the two second extending segments 232 are symmetrically arranged or asymmetrically arranged; specifically, in this embodiment, the two second extending segments 232 are symmetrically arranged, that is, one second extending segment 232 can coincide with the other second extending segment by taking the center of the pressure concentration point position as a rotation point to rotate by 180 degrees, thereby further facilitating an uniform concentration of the pressure or the applied force at the pressure concentration point position 231. Preferably, for benefiting the production, the second extending segment 232 is shaped as a transversal strip structure and the two second extending segments 232 are disconnected from each other.

What's more, in order to immobilize the first sensing board member 20 conveniently, a circumference of the first sensing board member 20 is provided with a fixed structure, such that the position of the first sensing board member 20 can be immobilized when the first sensing board member 20 is arranged on the second sensing board member 30.

Specifically, the aforesaid fixed structure comprises a fixing edge strip, the fixing edge strip is arranged at the circumference of the first sensing board member 20; optionally, the fixed structure on the first sensing board member 20 can also be in other various form structures, such as a supporting rib arranged at a circumference of the first sensing board member 20 and so on.

Figure 2:
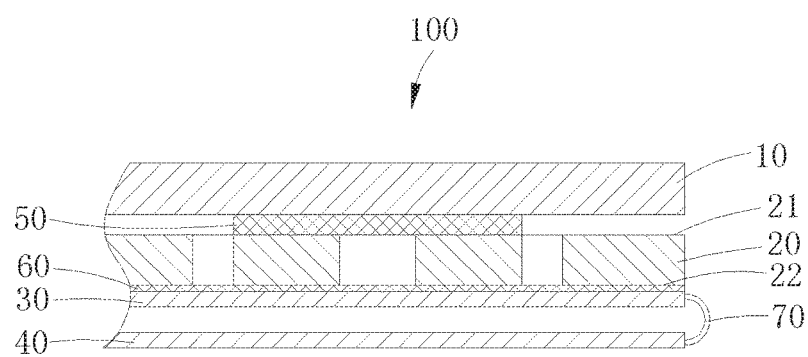
FIG. 2 illustrates a structural schematic view of the pressure sensing device of the present application.

Please refer to FIG. 1 and FIG. 2, the second sensing board member 30 in this embodiment comprises a pressure sensing layer (not labeled in the figures) and a sensing component arranged on the pressure sensing layer (not labeled in the figures), the cut-out pattern 23 and the sensing component are symmetrically arranged, such that when the pressure is concentrated at the pressure concentration point position 230, the pressure can be effectively transmitted to the sensing component of the second sensing board member 30, which is beneficial for the second sensing board member 30 to perform a next operation for the pressure.

Preferably, the inductive component is a coating or a circuit having a pressure sensing function.

Please refer to FIG. 1 and FIG. 2 again, the first connecting material 50 of this embodiment is any one of a double-sided adhesive, an acrylic polystyrene foam, a UV glue, an AB glue and a silica gel that can connect the top panel 10 with the first sensing board member 20 and make the top panel 10 and the first sensing board member 20 be spaced from each other. Specifically, in one aspect, the first connecting material 50 mainly functions as a spacer between the top panel 10 from the first sensing board member 20, such that the top panel 10 can be maintained to be spaced from the first sensing board member 20 under the action of an external force; in another aspect, the first connecting material 50 is configured for transmitting a pressure received by the top panel 10 to the cantilever structure 233 of the cut-out pattern 23 of the first sensing board member 20. In this embodiment, when the first connecting material is selected to be the acrylic polystyrene foam, preferably, the acrylic polystyrene foam is VHB acrylic polystyrene foam, the VHB acrylic polystyrene foam is in a square structure and has a thickness of 0.6 mm. Of course, the first connecting material 50 can also be selected to be the UV glue, wherein the UV glue is formed by dispensing, and has a height of 0.3 mm; meanwhile, it should also be ensured that all of the UV glue is connected with both the top panel 10 and the first sensing board member 20 together.

In this embodiment, in order to make the second sensing board member 30 be tightly connected with the first sensing board member 20, the second sensing board member 30 is connected with the lower surface of the first sensing board member 20 through a second connecting material 60, and the second connecting material 60 is any one of a double-sided adhesive, an acrylic polystyrene foam, a UV glue, an AB glue and a silica gel.

In addition, the control circuit board 40 in this embodiment is electrically connected with the second sensing board member 30 through a connecting wire 70, specifically, one end of the connecting wire 70 is welded with the control circuit board 40, and the other end of the connecting wire 70 is welded with the second sensing board member 30.

Herein, the working principle of the pressure sensing device 100 in this embodiment is further described below in accompany with the figures.

When a user applies a certain pressure on the top panel 10, the pressure will be transmitted to the first sensing board member 20 through the first connecting material 50; and when the first sensing board member 20 is subjected to the pressure, the applied force can be concentrated at the pressure concentration point position 230 of the cut-out pattern 23; in this way, the pressure can be transmitted to the cantilever structure 233 near the pressure concentration point position 230, and the cantilever structure 233 can be deformed when being subjected to the pressure; at this moment, the second sensing board member 30 affixed to the lower surface 22 of the first sensing board member 20 can detect the deformation of the cantilever structure 233, such that the second sensing board member 30 can sense the pressure applied on the top panel 10; at this moment, a pressure generated electric signal can be transmitted to the control circuit board 40 through the connecting wire 70, and the control circuit board 40 can control the touch control electronic device to perform a corresponding task according to the pressure generated electric signal applied by the user and transmitted from the second sensing board member 30.

Embodiment II

Figure 4:
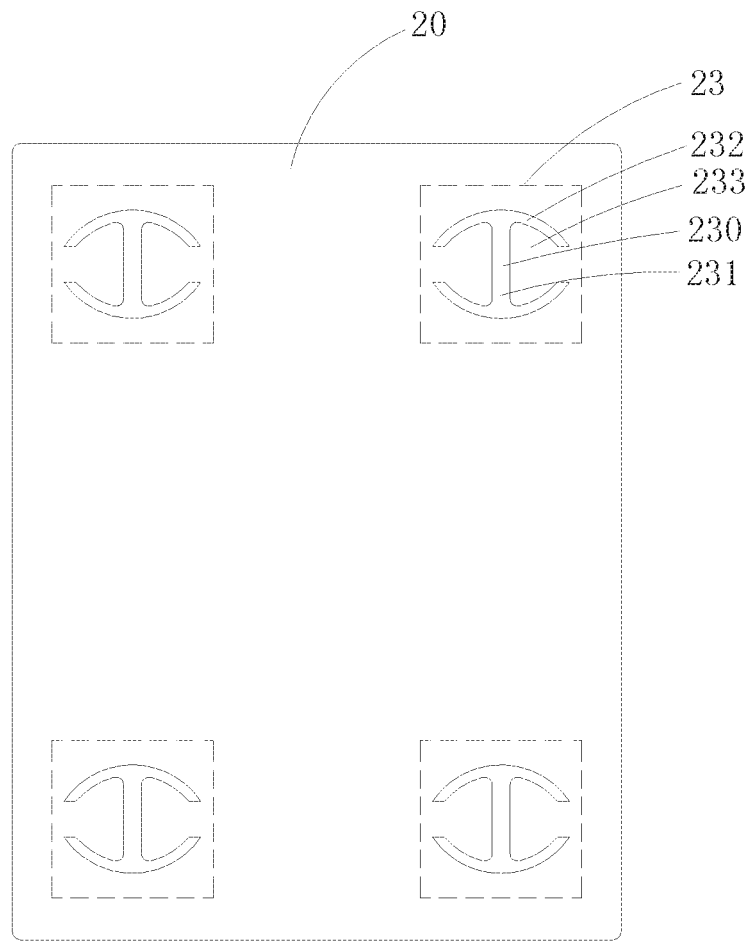
FIG. 4 illustrates a schematic view of a pressure sensing device of another embodiment of the present application.

Please refer to FIG. 4, the implementation mode of embodiment II is substantially similar to that of embodiment I, the details thereof can refer to the implementation mode of embodiment I, and are not described in detail here; however, the difference between the embodiments I and II lies in that:

in the embodiment I, there are two first extending segments 231, and there are also two corresponding second extending segments 232; the two second extending segments 232 are shaped as strip structures;

However, in the embodiment II, there are two first extending segments 231, and there are also two second extending segments 232, but the two second extending segments 232 are arc-shaped; the two arc-shaped second extending segments 232 are disconnected with each other, thereby forming a non-closed circle.

Embodiment III

Figure 5:
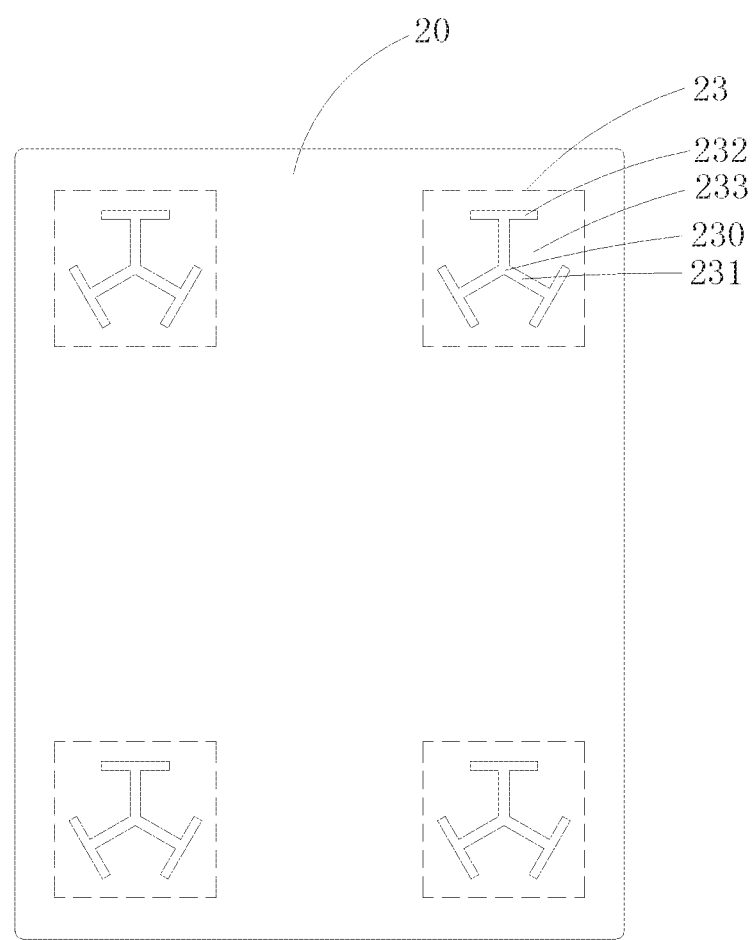
FIG. 5 illustrates a schematic view of a pressure sensing device of another embodiment of the present application.

Please refer to FIG. 5, the implementation mode of embodiment III is substantially similar to that of embodiment I, the details thereof can refer to the implementation mode of embodiment I, and are not described here; however, the difference between embodiments I and II lies in that:

in embodiment I, there are two first extending segments 231, and there are also two corresponding second extending segments 232, and the two second extending segments are shaped as strip structures;

However, in embodiment III, there are three first extending segments 231; wherein, the three first extending segments 231 are symmetrically arranged, that is, one first extending segment 231 can coincide with the another first extending segment 231 by taking the center of the pressure concentration point position 230 as a rotation point and rotating by 120 degrees, thereby further facilitating a uniform concentration of the pressure or applied force at the pressure concentration point position 230. Correspondingly, there are three second extending segments 232, wherein the three second extending segments 232 are arranged symmetrically, that is, one second extending segment 232 can coincide with another second extending segment 232 by taking the center of the pressure concentrating point position 230 as a rotating point to rotate by 120 degrees, thereby further facilitating a uniform concentration of the pressure or applied force at the pressure concentrating point position 230. Furthermore, the three second extending segments 232 are shaped as transversal strip structures.

Embodiment IV

Figure 6:
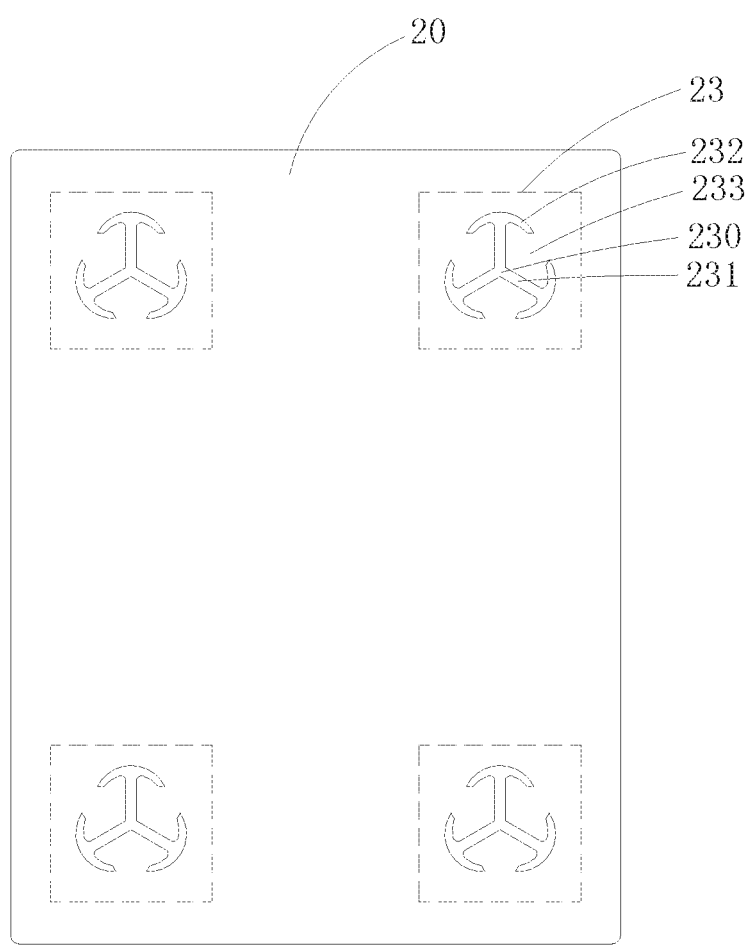
FIG. 6 illustrates a schematic view of a pressure sensing device of another embodiment of the present application.

Please refer to FIG. 6, the implementation mode of embodiment IV is substantially similar to that of embodiment III, the details thereof can refer to the implementation mode of embodiment III, and are not described here; however, the difference between embodiments III and IV lies in that:

in embodiment III, there are three first extending segments 231, and there are also three corresponding second extending segments 232, and the three second extending vacant spaces 232 are shaped as transversal strip structures;

however, in embodiment I, there are three first extending segments 231, and there are also three corresponding second extending segments 232, and the three second extending segments 232 are arc-shaped.

Embodiment V

Figure 7:
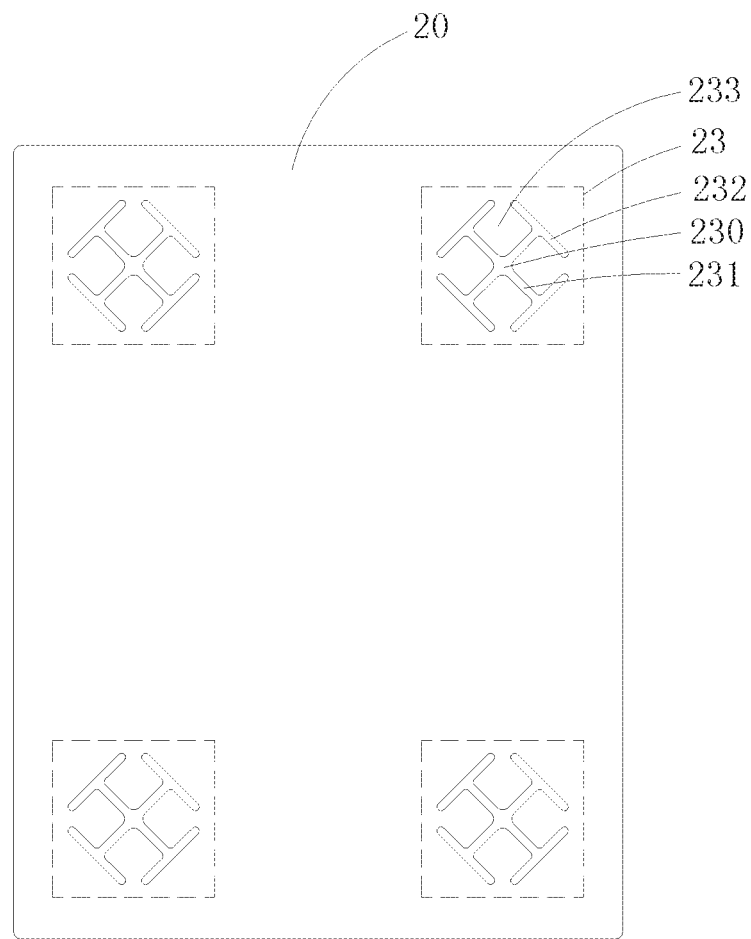
FIG. 7 illustrates a schematic view of a pressure sensing device of another embodiment of the present application.

Please refer to FIG. 7, the implementation mode of embodiment V is substantially similar to that of embodiment I, and the details thereof can refer to the implementation mode of embodiment I, and are not described here; however, the difference between embodiments I and IV lies in that:

in embodiment I, there are two first extending segments 231, and there are also two corresponding second extending segments 232, and the two second extending segments are shaped as strip structures.

However, in embodiment V, there are four first extending segments 231; wherein, the four first extending segments 231 are symmetrically arranged, that is, one first extending segment 231 can coincide with the another first extending segment 231 by taking the center of the pressure concentration point position 230 as a rotation point to rotate by 120 degrees, thereby further facilitating a uniform concentration of the pressure or applied force at the pressure concentration point position 230. Correspondingly, there are four second extending segments 232, wherein the four second extending segments 232 are arranged symmetrically, that is, one second extending segment 232 can coincide with another second extending segment 232 by taking the center of the pressure concentrating point position 230 as a rotating point to rotate by 120 degrees, thereby further facilitating a uniform concentration of the pressure or applied force at the pressure concentrating point position 230. Furthermore, the three second extending segments 232 are shaped as transversal strip structures.

Embodiment VI

Figure 8:
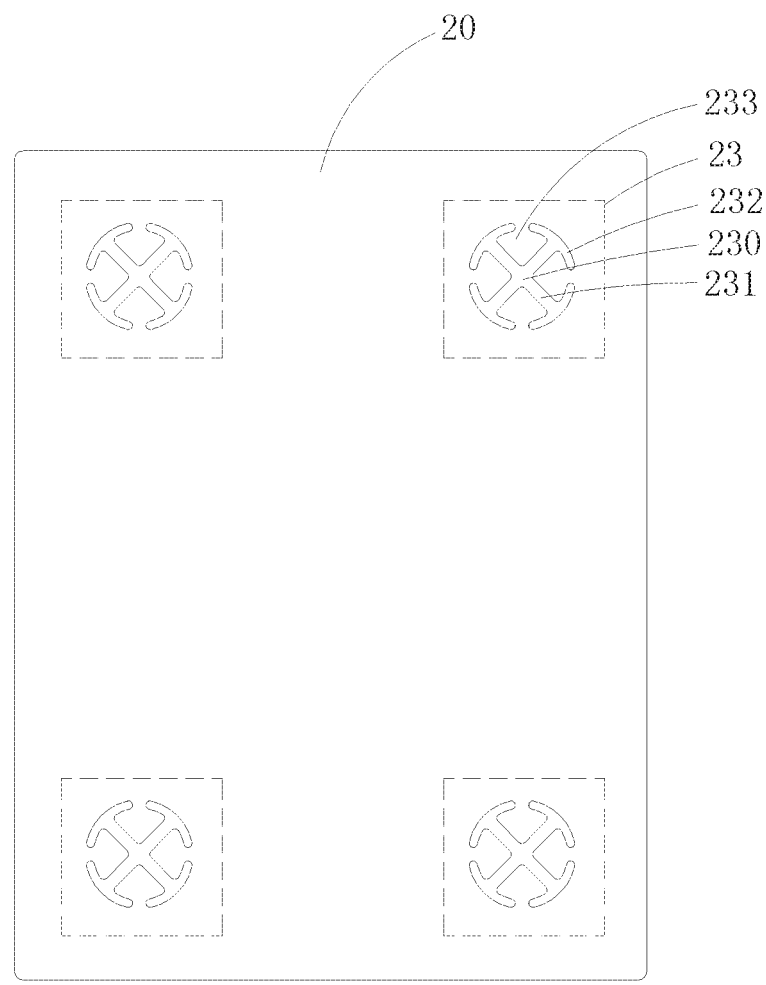
FIG. 8 illustrates a schematic view of a pressure sensing device of another embodiment of the present application.

Please refer to FIG. 8, the implementation mode of embodiment VI is substantially similar to that of embodiment V, and the details thereof can refer to the implementation mode of embodiment V, and are not described here; however, the difference between embodiments V and VI lies in that:

in embodiment V, there are four first extending segments 231, and there are also four corresponding second extending segments 232, and the four second extending segments 232 are shaped as strip structures;

however, in embodiment VI, there are four first extending segments 231, and there are also four corresponding second extending segments 232, and the four second extending segments 232 are arc-shaped.

An Embodiment of a Pressure Measuring Apparatus

Figure 9:
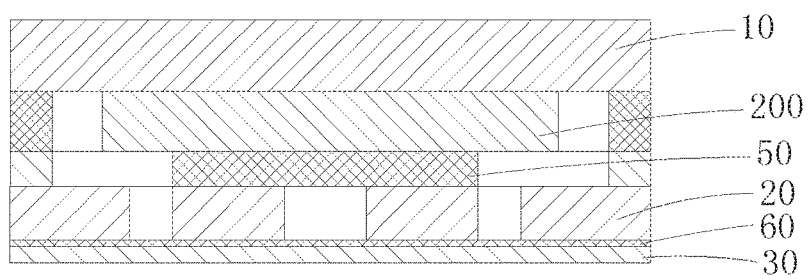
FIG. 9 illustrates a schematic view of applying a pressure sensing device of the present application in a pressure measuring apparatus, a touch control board, and a display apparatus.

Please refer to FIG. 9 and in combination with FIGS. 1-8, an optimal embodiment of a pressure measuring apparatus of the present application is described hereinafter.

The pressure measuring apparatus of this embodiment comprises the aforesaid pressure sensing device 100, and the top panel 10 is a metal panel, a glass panel, and a plastic panel. In addition, the pressure measuring apparatus has a main controller configured to control the pressure measuring apparatus to work, and the main controller is electrically connected with the control circuit board 40.

Since the pressure measuring apparatus in this embodiment has the aforesaid pressure sensing apparatus 100, specifically, the first sensing board member 20 of the pressure sensing apparatus 100 is provided thereon with cut-out patterns 23, and each cut-out pattern 23 comprises a pressure concentration point position 230, when a user applies a certain pressure on the top panel 10, the pressure can be transmitted to the first sensing board member 20 through a first connecting material 50; when the first sensing board member 20 is subject to a force, the applied force can be concentrated at the pressure concentration point position 230 of the cut-out pattern 23, thereby ensuring the user to press accurately; afterwards, the applied force will be transmitted to the second sensing board member 30, and then the control circuit board 40 will control the touch control electronic device to do a corresponding task according to information of the pressure applied by the user and transmitted by the second sensing board member 20. It can be seen that the whole touching operation is simple and convenient, and is easy to be measured; meanwhile, the pressure sensing device 100 has a simple structure, is easy to be processed, and has low manufacturing cost, which facilitates popularization and use of the pressure measuring apparatus in touch control electronic devices.

An Embodiment of a Touch Control Board

Please refer to FIG. 9 and in combination with FIGS. 1-8, an optimal embodiment of a touch control board of the present application is described hereinafter.

The touch control board of this embodiment has the aforesaid pressure sensing device 100, and the top panel 10 is a pressure controllable mouse panel. In addition, the touch control board has a main controller configured to control the touch control board to work, and the main controller is electrically connected with the control circuit board 40.

Since the touch control board in this embodiment has the aforesaid pressure sensing apparatus 100, specifically, the first sensing board member 20 of the pressure sensing apparatus 100 is provided thereon with cut-out patterns 23, and each cut-out pattern 23 comprises a pressure concentration point position 230, when a performer applies a certain pressure on the top panel 10, the pressure can be transmitted to the first sensing board member 20 through a first connecting material 50; when the first sensing board member 20 is subject to a force, the applied force can be concentrated at the pressure concentration point position 230 of the cut-out pattern 23, thereby ensuring the user to press accurately; afterwards, the applied force will be transmitted to the second sensing board member 30, and then the control circuit board 40 will control the touch control electronic device to do a corresponding task according to information of the pressure applied by the performer and transmitted by the second sensing board member 20. It can be seen that the whole touching operation is simple and convenient, and is easy to be measured; meanwhile, the pressure sensing device 100 has a simple structure, is easy to be processed, and has low manufacturing cost, which facilitates popularization and use of the touch control board in touch control electronic devices.

An Embodiment of a Display Apparatus

Please refer to FIG. 9 and in combination with FIGS. 1-8, an optimal embodiment of a display apparatus of the present application is described hereinafter.

The display apparatus of this embodiment has the aforesaid pressure sensing device 100, and an top panel 10 is a touch control screen or a touch control screen that combines a touch control function and a display function together; wherein, if the top panel 10 is the touch control screen that combines the touch control function and the display function together, the top panel 10 is the equivalent of a combination of a normal capacitive touch screen and a screen 200. In addition, the display apparatus comprises a main controller configured to control the display apparatus to work, and the main controller is electrically connected with the control circuit board 40.

Since the display apparatus in this embodiment has the aforementioned pressure sensing apparatus 100, specifically, the first sensing board member 20 of the pressure sensing apparatus 100 is provided thereon with cut-out patterns 23, and each cut-out pattern 23 comprises a pressure concentration point position 230, when a performer applies a certain pressure on the top panel 10, the pressure can be transmitted to the first sensing board member 20 through a first connecting material 50; when the first sensing board member 20 is subject to a force, the applied force can be concentrated at the pressure concentration point position 230 of the cut-out pattern 23, thereby ensuring the performer to press accurately; afterwards, the applied force will be transmitted to the second sensing board member 30, and then the control circuit board 40 will control the touch control electronic device to do a corresponding task according to information of the pressure applied by the user and transmitted by the second sensing board member 20. It can be seen that the whole touching operation is simple and convenient, and is easy to be measured; meanwhile, the pressure sensing device 100 has a simple structure, is easy to be processed, and has low manufacturing cost, which facilitates popularization and use of the pressure measuring apparatus in touch control electronic devices.

The aforementioned embodiments are only preferred embodiments of the present application, and the structures thereof should not be limited by the structures listed above. Any modification, equivalent replacement, improvement, and so on, which are made within the spirit and the principle of the present application, should be included in the protection scope of the present application.

The invention claimed is:

1. A pressure sensing device comprising:
    a top panel configured to receive external pressure from a user;
    a first sensing board member configured to sense external pressure acting thereon, the first sensing board member comprising an upper surface and a lower surface opposite to the upper surface, the first sensing board member being provided thereon with plural cut-out patterns configured to concentrate the external pressure to sense, each said cut-out pattern comprising a pressure concentration point position, at center of the cut-out pattern, configured for concentrating the external pressure at a point location, wherein the upper surface of the first sensing board member with the cut-out patterns is connected to the top panel through a first connecting material;
    a second sensing board member configured to sense external pressure acting thereon, wherein the second sensing board member is connected to the lower surface of the first sensing board member; and
    a control circuit board configured to control a touch control electronic device to perform a corresponding task according to information of the pressure applied by the user, wherein the control circuit board is electrically connected with the second sensing board member.

2. The pressure sensing device according to claim 1, wherein the cut-out patterns each further comprise at least two first extending segments arranged to extend outwards from the pressure concentration point position.

3. The pressure sensing device according to claim 2, wherein the first extending segments are shaped as a strip.

4. The pressure sensing device according to claim 2, wherein the at least two first extending segments are symmetrically arranged.

5. The pressure sensing device according to claim 4, further comprising at least two second extending segments configured to extend sideward from the two ends of at least one of the first extending segments.

6. The pressure sensing device according to claim 5, wherein the at least two second extending segments are symmetrically arranged.

7. The pressure sensing device according to claim 5, wherein the second extending segment is shaped as a strip.

8. The pressure sensing device according to claim 5, wherein the second extending segment is shaped as an arc.

9. The pressure sensing device according to claim 5, wherein the at least two second extending segments are asymmetrically arranged.

10. The pressure sensing device according to claim 2, wherein the at least two first extending segments are asymmetrically arranged.

11. The pressure sensing device according to claim 1, wherein the plural cut-out patterns comprise at least four cut-out patterns arranged uniformly at a circumference of the first sensing board member.

12. The pressure sensing device according to claim 1, wherein the second sensing board member comprises a pressure sensing layer and sensing components are arranged on the pressure sensing layer, wherein the cut-out patterns are arranged to be aligned with the sensing components.

13. The pressure sensing device according to claim 12, wherein the sensing component comprises a coating or a circuit having pressure sensing effect.

14. The pressure sensing device according to claim 12, wherein the first connecting material is any one of a double-sided adhesive, an acrylic polystyrene foam, a UV glue, an AB glue and a silica gel configured to connect the top panel to the first sensing board member and to provide a spacer between the top panel and the first sensing board member.

15. The pressure sensing device according to claim 12, wherein the second sensing board member is connected with the lower surface of the first sensing board member through a second connecting material, and the second connecting material is any one of a double sided adhesive, an acrylic polystyrene foam, a UV glue, an AB glue and a silica gel.

16. The pressure sensing device according to claim 12, wherein the control circuit board is electrically connected with the second sensing board member through a connecting wire.

17. A touch control board comprising the pressure sensing device according to claim 1, wherein the top panel is a pressure controllable mouse board.

18. A display apparatus comprising the pressure sensing device according to claim 1, wherein the top panel is a touch screen or a touch control display screen that combines a touch control function and a display function into one.

19. A pressure sensing device having a panel configured to receive external pressure, the pressure sensing device comprising:

a first sensing board configured to sense external pressure acting thereon, the first sensing board comprising first and second opposing surfaces connected to one another through a connecting material, the first sensing board first surface defining a cut-out pattern configured to concentrate the external pressure, said cut-out pattern comprising a pressure concentration point position, at center of the cut-out pattern, configured for concentrating the external pressure at a point location;

a second sensing board configured to sense external pressure acting thereon, the second sensing board being connected to the first sensing board lower surface; and a control circuit configured to control a touch control electronic device to perform a task in response to the sensed external pressure, the control circuit being electrically coupled to the second sensing board.

* * * * *